United States Patent Office 3,715,190
Patented Feb. 6, 1973

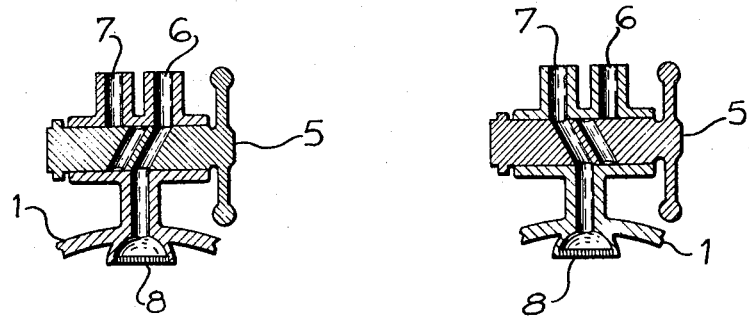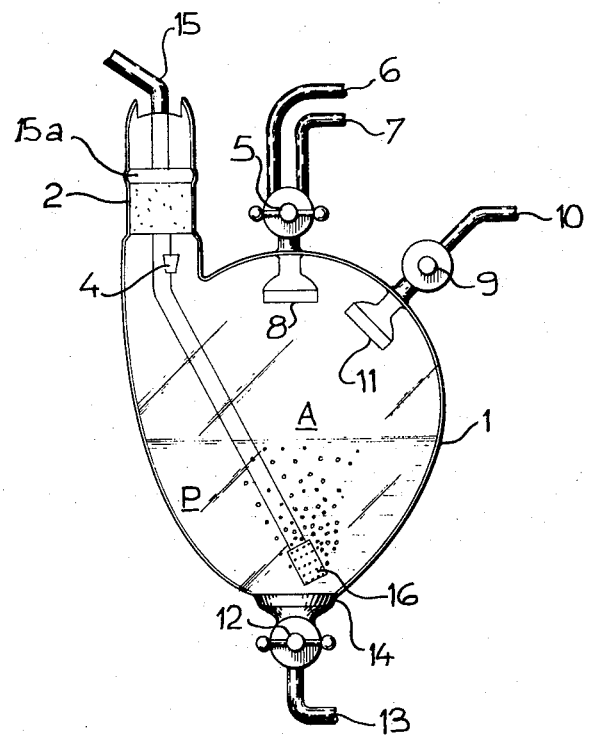
FIG. 2 FIG. 3
FIG. 4

3,715,190
SYSTEM FOR THE SOLID-PHASE
PEPTIDE SYNTHESIS
Won Kil Park, Sherbrooke, Quebec, and Domenico
Regoli, Magog, Quebec, Canada, assignors to University
de Sherbrooke, Sherbrooke, Quebec, Canada
Filed Sept. 23, 1971, Ser. No. 182,938
Int. Cl. C07c 103/52
U.S. Cl. 23—252 R                13 Claims

ABSTRACT OF THE DISCLOSURE

Apparatus for the solid-phase peptide synthesis which comprises a reaction vessel consisting of a flask having a side arm defining an inlet through which a polymer can be inserted into the flask. Means are provided to separately insert a solvent and a reagent inside the flask while they are distributed uniformly along the inner walls of the flask. At the bottom of the flask, there are means to remove the solvent and waste products from the flask, preferably by suction. The flask has an opening to permit an entry of air inside the flask in order to control the pressure inside the flask and to facilitate removal of solvent and waste products. The apparatus also comprises means associated with the reaction vessel to shake the latter and to cause synthesis of the peptide to take place. The solvent and reagent are contained in reservoirs which are connected to the reaction vessel at a point where the latter separately introduces solvent and reagent therein. Finally, means are provided to cleave the peptide when the synthesis is terminated.

Figure 1:
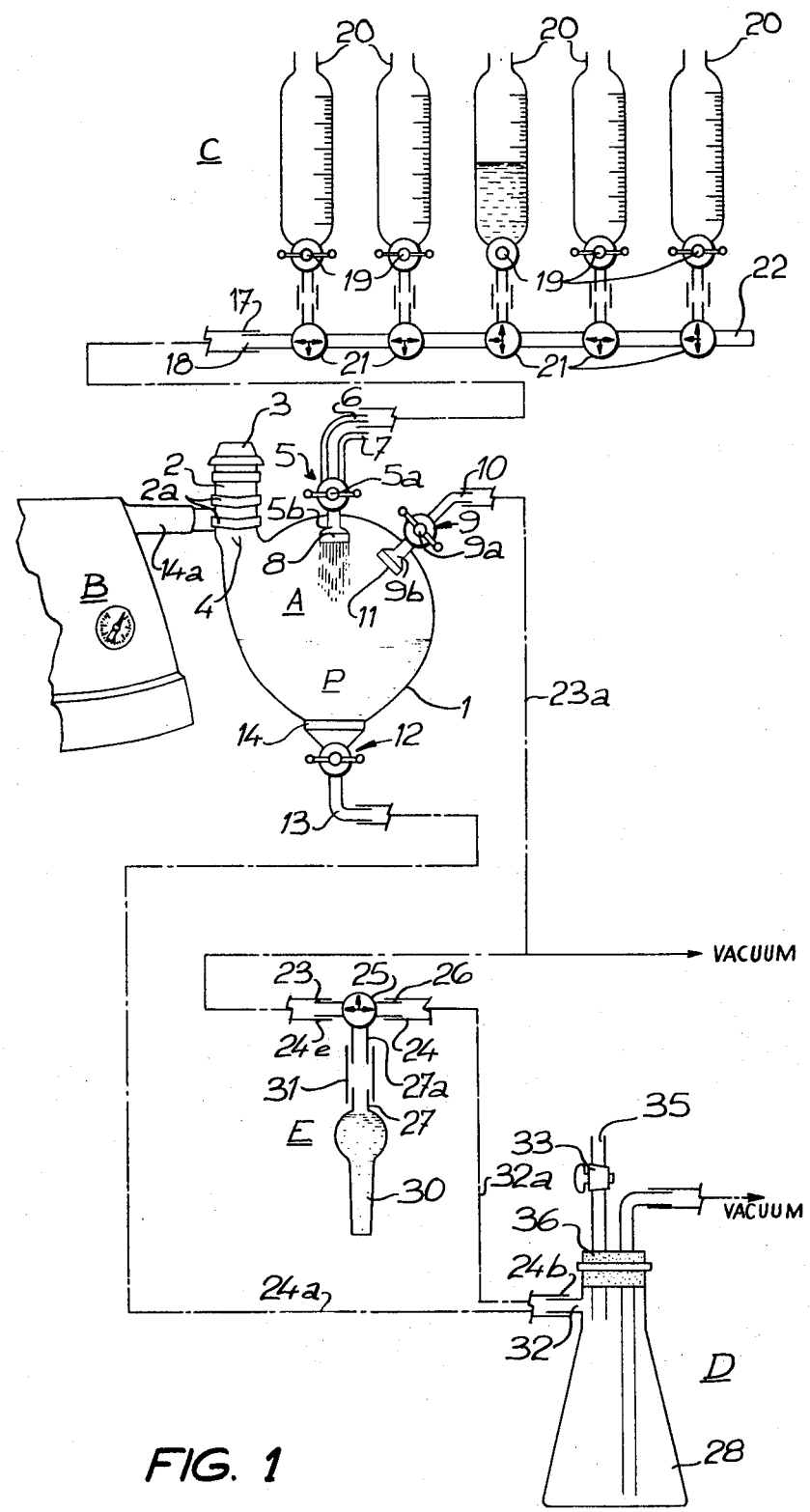

This invention is directed to a system for the solid-phase peptide synthesis.

The solid-phase peptide synthesis has been introduced to accelerate and simplify the synthesis of peptide. Synthetic peptides are important in many areas: to chemists, as the ultimate proof of the structure of natural products; to biochemists, as model for studying the specificity and the mechanism of action of enzymes and hormones; to physical chemists, as model for the investigation of proteins structure and conformation; to pharmacologists, as source of products which are reproductions of the structure of naturally occurring substances; finally, to immunologists, as a tool for the finding and understanding of immunological specificity.

The method of solid-phase peptide synthesis is based on the principle that a peptide chain can be synthetized in a stepwise manner, while one end of the chain is covalently attached to an insoluble solid support which is a resin. The amino-acids are added one at the time in a stepwise manner until the desired sequence is obtained. Then, the peptide chain is cleaved from the solid support.

All the reactions for the synthesis, including the intermediate purification procedures, are best conducted by using a single reaction vessel. Every amino-acid is dissolved in its specific solvent and is introduced into the vessel at the proper time. Since each of the reaction (necessary to attach the various amino-acids) in the synthesis of a peptide can be modified in a variety of ways, it is important to carry out the reaction in an apparatus with sufficient flexibility to cope with a wide range of reactions and conditions.

Manual and automatic apparatuses for the solid-phase peptide synthesis are known. Although the automatic apparatus is certainly the most elaborated and perfected instrument for this kind of work, there are some disadvantages which justify the introduction of manual systems which are more and more perfected and flexible. For example manual systems can be accessible to small laboratories and to a large number of scientists interested in the solid-phase peptide synthesis. The cost of a manual apparatus is about 1/20 of the cost of an automatic apparatus. With respect to time, the manual apparatus is obviously more time consuming than the automatic. However, for short peptides, the advantages of the automatic apparatus over the manual are quite limited. Finally, the basic principles of the solid-phase peptide synthesis are applied to the synthesis of other polymers of defined structures. Obviously, all the preparatory work and the preliminary experiments for the synthesis of polymers having structures different than the peptides, must be carried out in a manual apparatus, in order to be completed and perfected before setting the method into a program as the one used in the automatic apparatus. Finally, the manual system allows a checking of every step of every cycle during the synthesis, while the automatic apparatus cannot be stopped for checking intermediate phases.

Some of the manual apparatuses have an elongated construction and are rotated 90° between the vertical and the horizontal position with the result that it is not possible to allow complete washing and mixing of the polymer which adheres to the upper side of the vessel.

Upright stationary vessels are also known. However, relatively large amounts of resins have to be used and the last traces of solvent or of reagent are hard to be removed because of the special filtering arrangement. Moreover, these vessels use a special funnel to add the solvent or the reagent and this funnel is unstable and may be broken when shaking the vessel with a wrist-action shaker. In some upright stationary vessels, there is a mechanical stirrer which does not assure a mixing of the resin and of the solvent as good as when a shaker is used.

The reaction vessel is the most important component of a system for a solid-phase peptide synthesis and it should have the following characteristics:

(a) A volume which allows a reasonable variation in batch size.
(b) It should allow a rapid and thorough suspension of the polymer so that all beds are in good contact with the solvent without being subjected to any grinding action, such as is the case with magnetic stirrers.
(c) The vessel should allow a rapid and convenient addition of solvent in such a way that vessel walls are washed down and the solvent is well mixed with the resin.
(d) It should allow different solvent volumes to be used at will, with equal efficiency of polymer contact.
(e) It should allow convenient removal of polymer samples during the procedure of synthesis, and finally,
(f) It should provide for rapid and complete solvent filtration.

In order to overcome the disadvantage of prior art systems we have provided an apparatus which comprises a reaction vessel consisting of a flask having a side arm defining an inlet through which a polymer can be inserted into the flask. Means are provided to separately insert a solvent and a reagent inside the flask while they are distributed uniformly along the inner walls of the flask. At the bottom of the flask, there are means to remove the solvent and waste products from the flask, preferably by suction. The flask has an opening to permit an entry of air inside the flask in order to control the pressure inside the flask and to facilitate removal of solvent and waste products. The apparatus also comprises means associated with the reaction vessel to shake the latter and to cause synthesis of the peptide to take place. The solvent and reagent are contained in reservoirs which are connected to the reaction vessel at a point where the latter separately introduces solvent and reagent therein. Finally, means are provided to cleave the peptide when the synthesis is terminated.

In the drawings which illustrate the invention,

FIG. 1 is a diagram of the main components of a system according to the present invention, FIG. 2 is a view of the three-way stop-cock used for separately inserting solvent and reagent into the reaction vessel shown in a position for introducing the solvent, FIG. 3 is a view of the same stop-cock in the position for introducing the reagent, and FIG. 4 is a view of the reaction vessel equipped with a gas dispersion tube.

Referring to the drawings, especially FIG. 1, it will be seen that the apparatus is made of the following components: a reaction vessel A, a shaker B, reservoirs C for solvent and reagent, a vacuum system D and a dryer E.

The reaction vessel A consists of a round bottom, spherical flask 1 made of Pyrex glass (the term Pyrex is a trademark) which is provided with a side arm 2. The side arm 2 defines an inlet through which polymer P can be inserted into the flask 1. The side arm 2 is formed with hooks 4 which are used to tie up ground joint stopper 3 by means of a rubber band not shown in the drawings, in order to keep the ground joint stopper fixed. The side arm 2 is also used to attach the reaction vessel A to the shaker B. This is accomplished by firmly fixing the side arm 2 of the reaction vessel A to the clamp 2a of the shaker B.

The reaction vessel A also comprises in the uppermost portion a three-way stop-cock 5 which projects outwardly from the flask 1 and which is formed of a control knob 5a, an outlet 5b and two Teflon channels 6 and 7 which are respectively intended for the solvent and the reagent. The term Teflon is a trademark. At the end of the outlet 5b there is provided a filter 8 which will be used to remove waste products from both the solvent and the reagent as they pass through the filter, as will be explained later.

In the upper part of the flask 1, near the three-way stop-cock 5, there is a two-way stop-cock 9 which also projects outwardly from the reaction vessel A in the manner illustrated in the drawings. The two-way stop-cock 9 has an inlet tube 10, a control knob 9a and outlet end 9b. A filter 11 is mounted at the outlet end 9b between the inside of the vessel and the stop-cock 9. The function of the filter 11 is to remove waste which may be present in the air which is admitted inside the reaction vessel A through stop-cock 9 and also to prevent the polymer from entering inside the outlet end 9b of the stop-cock 9.

At the bottom of the reaction vessel A, there is a two-way stop-clock 12 which is connected with the vacuum system D by means of tube 13. A large extra course disc filter 14 is inserted between the inside of the vessel and the entrance to stock-cock 12. This filter 14 is extra large in order to allow rapid filtration when negative pressure is applied through tube 13 and while at the same time stop-cock 9 is open. The filter 14 is used mainly to prevent the polymer from diffusing or passing outside reaction vessel A.

Turning now to the shaker B, the latter is a wrist action shaker as sold by Fisher under catalogue No. 14–260 VI. The shaker B has an arm 14a which as described above is provided with clamps 2a to be attached to the side-arm 2 of the flask 1.

As stated above the solvent and the reagent are stored in reservoirs C formed of cylindrical funnels 20. It should be stated that the funnels can be closed at the top with a glass stopper or with a rubber stopper holding a glass rod and a stop-cock. These devices for closing the funnels at the top have not been illustrated for the sake of clarity. A stop-cock 19 is inserted at the bottom of each funnel 20, between the funnel and a T-shape three-way stop-cock 21 provided for each funnel 20. The T-shape three-way stop-cocks 21 are assembled in series below the funnels 20, all in the manner illustrated in FIG. 1 of the drawings.

A glass tube 18 connects the three-way stop-cock 21 to a rubber tube 17 the latter being used to feed solvent or reagent to reaction vessel A. Tube 22 is closed at the right end.

The vacuum system D is made of an Erlenmeyer flask 28 which is connected to the reaction vessel A through side arm 32, rubber tubing 24b and duct 32a either via the dryer E to the two-way stop-cock 9 or via duct 24a to the stop-cock 12. The vacuum system D also comprises a stop-cock 33 which serves the glass rod 35 the latter being inserted through rubber stopper 36. The glass rod 35 and stop-cock 33 are used to control the degree of vacuum in the system.

Finally, the last component of the system is dryer E. This component includes a drying tube 30 which is connected to three-way stop-cock 25 by means of glass tube 27 and 27a and rubber tube 31. The three-way stop-cock 25 is in communication on one side with a glass tube 26, a rubber tube 24 and duct 32a to the vacuum system D. On the other side, the three-way stop-cock is connected to the glass tube 10 of stop-cock 9 by means of glass tube 23, rubber tube 24e and duct 23a.

The last element of the apparatus illustrated is a gas dispersion tube 15 which is made to hermetically fit the side-arm 2 and has at the end a glass filter 16. To fit the gas dispersion tube 15 in side-arm 2 the tube 15 is mounted in a stopper 15a.

The side-arm is used to attach the reaction vessel to the shaker. The polymers are inserted into the vessel through the side-arm and samples of products can be taken from the side-arm to control the intermediate step of the synthesis. Moreover, for the cleavage of the peptides at the end of the synthesis, the side-arm is used to insert the gas dispersion tube. Before entering into the vessel, reagents and solvents passed through filter 8 which removes waste. Stop-cock 5 is used to separately and independently insert reagents (amino-acids) and solvents (various organic solvents used for the synthesis). The position of this stop-cock at the top is necessary in order to allow solvents and reagents to be distributed in a uniform way along the walls of the vessel. This process is facilitated by the filter provided that the latter is fixed in a proper way to the end 5b of the stop-cock. Filter 8 is an extra coarse disc the most important function of which is to avoid that the polymer diffused to the stop-cock.

Stop-cock 9 is used to control the pressure and to bring air to the vessel. The procedure of attaching one amino-acid to the polymer requires at least 30 to 40 manipulations i.e. activation of the amino-acid previously attached, application of the new amino-acid to be attached to the chain, repeated washing with various solvents, etc. After every reaction, the solvent is removed by filtration through stop-cock 12 and during this procedure, stop-cock 9 must be opened in order to allow the entrance of air and to facilitate the removal of solvents and waste products.

Stop-cock 9 is also used to decrease or increase the pressure inside the vessel and consequently, tube 10 can be connected either with vacuum system D or with a pressure controlling system, if positive pressure has to be used.

As mentioned before, stop-cock 12 is mostly used to remove solvents and waste products by filtration.

A reagent or solvent is then applied by opening the stop-cock at the bottom of a funnel 20 and by turning stop-cock 21 so that the reagents or solvents flow from tube 18 to rubber tube 17 and then to the reaction vessel A. The volume of reagents or solvents applied can be measured from the graduation inscribed on the walls of the funnels. When a certain amount of the solvents and reagents has been applied all the three-way stop-cocks 21 are set in a position which allows the fluid to move to the reaction vessel.

The pressure inside the reaction vessel is controlled by the drying tube E and the vacuum system D. During the reaction, the reaction vessel A is agitated by the shaker B. At the end of the reaction the dispersion tube 15 is inserted through the side-arm 2 of the reaction vessel A for cleaving the peptides. The dispersion tube 15 is connected to a flask of hydrogen bromide (not shown) or of other gaseous reactants which are bubbled into the solution as shown in FIG. 4.

We claim:
1. An apparatus to be used for the solid-phase peptide synthesis which comprises:
   (a) a reaction vessel consisting of a flask having a side arm defining an inlet through which a polymer can be inserted into said flask, means to separately insert a solvent and a reagent inside said flask, while said solvent and said reagent are caused to be distributed uniformly along the inner walls of said flask, means located at the bottom of said flask to remove said solvent and waste porducts from said flask, an opening in said flask to permit an entry of air inside said flask in order to control the pressure inside said flask and to facilitate the removal of said solvent and waste products,
   (b) means operatively associated with said reaction vessel to shake said reaction vessel and to cause the synthesis of said peptide to take place,
   (c) reservoirs for said solvent and for said reagent and means to connect said reservoirs to said means first named in (a),
   (d) means to cleave said peptide when said synthesis is terminated.
2. An apparatus according to claim 1, wherein said reaction vessel consists of a round bottom flask.
3. An apparatus according to claim 2, wherein said round bottom flask is substantially spherical.
4. An apparatus according to claim 1, wherein said side arm is formed to receive a ground joint stopper, and comprises hooks to tie said ground joint stopper in said side arm by means of a rubber band.
5. An apparatus according to claim 1, wherein said means defined in (b) comprises a wrist action shaker which is attached to said side arm by means of a clamp provided in said shaker.
6. An apparatus according to claim 1, wherein said means to separately insert said solvent and said reagent inside said flask comprise a three-way stop-cock mounted in the upper-most portion of said flask to project outwardly therefrom, said three-way stop-cock formed with a control knob, an outlet end on one side of said knob and first and second channels on the other side of said control knob, said outlet end of said three-way stop-cock opening inside said flask, and a duct leading said solvent and said reagent in said first and second channels respectively whereby said three-way stop-cock will cause said solvent and said reagent to be selectively inserted in said flask.
7. An apparatus according to claim 6, wherein said reaction vessel is provided with a filter which is mounted at the outlet end of said three-way stop-cock to remove waste products from said solvent and said reagent as both pass through said filter.
8. Apparatus according to claim 7, which comprises a first group of funnels to contain said solvent and a second group of funnels to contain said reagent, a T-sharp three-way stop-cock for each said funnel, each said funnel terminated at the lower end with a two-way stop-cock to connect said funnel to said three-way stop-cock, said T-shape three-way stop-cocks assembled in series below said funnels in a manner to deliver said solvent or reagent to said three-way stop-cocks.
9. Apparatus according to claim 1, wherein said opening permitting an entry of air inside said flask is formed by a first two-way stop-cock mounted in the upper portion of said flask, said first two-way stop-cock having an inlet tube, a control knob and an outlet end said inlet tube on one side of said control knob outside said flask and said inlet tube on the other side of said control knob inside said flask, and a filter mounted at said outlet end of said first two-way stop-cock to remove waste which may be present in the air and to prevent said polymer from entering in the outlet end of said first two-way stop-cock.
10. Apparatus according to claim 9, wherein said inlet end of said first two-way stop-cock is connected to an air supply line, a dryer is mounted along said air supply line to purify said air.
11. Apparatus according to claim 10, wherein said dryer consists of a second three-way stop-cock mounted along said air supply line, said second three-way stop-cock also connected to a drying tube and a vacuum aspirator, so constructed and arranged in a first position of said second three-way stop-cock, said reaction vessel is not in communication with air, in a second position thereof, said reaction vessel is in communication with an air supply via said drying tube, and in a third position thereof, said reaction vessel is in communication with said vacuum aspiration to create a vacuum in said vessel.
12. Apparatus according to claim 11, wherein said means located at the bottom of said flask comprise a second two-way stop-cock mounted at the bottom of said flask and an extra coarse disc filter which is placed inside said vessel at the entrance of said second two-way stop-cock, said second two-way stop-cock connected to said vacuum aspirator by means of a tube, said extra coarse filter allowing rapid filtration of the content of said vessel when a negative pressure is applied through said tube by said vacuum aspirator.
13. Apparatus according to claim 12, which comprises a gas dispersion tube adapted to be inserted through said side arm for leaving said peptides when said synthesis has taken place.

References Cited
UNITED STATES PATENTS

| | | | |
|---|---|---|---|
| 3,531,258 | 9/1970 | Merrifield et al. | 23—252 R |
| 3,557,077 | 1/1971 | Brunfeldt et al | 23—253 A |
| 3,647,390 | 3/1972 | Kubodera et al. | 23—252 R |

MORRIS O. WOLK, Primary Examiner
R. E. SERWIN, Assistant Examiner

U.S. Cl. X.R.
23—259, 292; 260—112.5